US 8,462,819 B2

(12) United States Patent
Bedrosian

(10) Patent No.: US 8,462,819 B2
(45) Date of Patent: Jun. 11, 2013

(54) ADAPTIVE CLOCK RECOVERY WITH STEP-DELAY PRE-COMPENSATION

(75) Inventor: P. Stephan Bedrosian, Andover, MA (US)

(73) Assignee: LSI Corporation, San Jose, CA (US)

( * ) Notice: Subject to any disclaimer, the term of this patent is extended or adjusted under 35 U.S.C. 154(b) by 451 days.

(21) Appl. No.: 12/729,606

(22) Filed: Mar. 23, 2010

(65) Prior Publication Data

US 2011/0164630 A1 Jul. 7, 2011

Related U.S. Application Data

(60) Provisional application No. 61/292,534, filed on Jan. 6, 2010.

(51) Int. Cl.
| | |
|---|---|
| *H04J 3/06* | (2006.01) |
| *H04J 1/16* | (2006.01) |
| *H04J 3/14* | (2006.01) |
| *H04J 3/24* | (2006.01) |
| *H04L 1/00* | (2006.01) |
| *H04L 12/26* | (2006.01) |
| *H04L 12/28* | (2006.01) |
| *H04L 12/56* | (2006.01) |
| *G01R 31/08* | (2006.01) |
| *G06F 11/00* | (2006.01) |
| *G08C 15/00* | (2006.01) |

(52) U.S. Cl.
USPC ....... 370/503; 370/253; 370/474; 370/395.62

(58) Field of Classification Search
USPC ............. 370/231, 235, 252, 253, 395, 395.6, 370/395.62, 474, 503–520, 373; 375/354, 375/356, 371, 376
See application file for complete search history.

(56) References Cited

U.S. PATENT DOCUMENTS

| 5,896,427 | A | 4/1999 | Muntz et al. |
| 6,714,548 | B2 | 3/2004 | Lauret |
| 7,315,546 | B2 | 1/2008 | Repko et al. |
| 2003/0063625 | A1 | 4/2003 | Belk et al. |

(Continued)

FOREIGN PATENT DOCUMENTS

| EP | 1455473 B1 | 4/2008 |
| JP | 07046257 A | 2/1995 |

(Continued)

OTHER PUBLICATIONS

Extended European Search Report for Application No. 10 015 954 dated Apr. 5, 2011.

(Continued)

*Primary Examiner* — Kwang B Yao
*Assistant Examiner* — Adam Duda
(74) *Attorney, Agent, or Firm* — Mendelsohn, Drucker & Associates, P.C.; Steve Mendelsohn

(57) ABSTRACT

An adaptive clock recovery (ACR) subsystem processes an input phase signal indicative of jittery packet arrival times to generate a relatively smooth and bounded output phase signal that can be used to generate a relatively stable recovered clock signal. The input phase signal is also processed to detect and measure step-delays corresponding, for example, to path changes in the network routing of the packets. Step-delay pre-compensation is performed, in which the input phase signal is phase-adjusted, upstream of the ACR subsystem, based on the sign and magnitude of each detected step-delay. As a result, the ACR subsystem is substantially oblivious to the existence of such step-delays.

19 Claims, 8 Drawing Sheets

U.S. PATENT DOCUMENTS

| | | |
|---|---|---|
| 2003/0081550 A1 | 5/2003 | Mitchell et al. |
| 2004/0208268 A1 | 10/2004 | Yin Ying |
| 2006/0013263 A1 | 1/2006 | Fellman |
| 2011/0164630 A1 | 7/2011 | Bedrosian |

FOREIGN PATENT DOCUMENTS

| | | |
|---|---|---|
| JP | 08316948 A | 11/1996 |
| JP | 2006518557 A | 8/2006 |
| JP | 2009118272 A | 5/2009 |
| KR | 10 2004 0015617 A | 2/2004 |
| WO | WO 2005020486 A1 | 3/2005 |

OTHER PUBLICATIONS

Notice of Preliminary Rejection; Mailed Mar. 15, 2012 for corresponding Korean Application No. Oct. 2011-0000364.

Final Office Action; Mailed Aug. 15, 2012 for corresponding U.S. Appl. No. 12/768,852.

Examiner's Office Letter; Mailed Jul. 31, 2012 for corresponding JP Application No. 2011-000880.

100

100

ADAPTIVE CLOCK RECOVERY WITH STEP-DELAY PRE-COMPENSATION

CROSS-REFERENCE TO RELATED APPLICATIONS

This application claims the benefit of the filing date of U.S. provisional application No. 61/292,534 filed on Jan. 6, 2010, the teachings of which are incorporated herein by reference in their entirety.

BACKGROUND

1. Field of the Invention

The present invention relates to data communications, and, in particular, to timing recovery in packet-based communication systems.

2. Description of the Related Art

This section introduces aspects that may help facilitate a better understanding of the invention. Accordingly, the statements of this section are to be read in this light and are not to be understood as admissions about what is prior art or what is not prior art.

The goal for a receiver of a data signal in a data communication network that employs clock recovery is for the receiver to derive, from the received data signal, a clock signal representing the time domain of the data signal, so that the receiver can use the derived clock signal to process (e.g., recover the data from) the data signal. In physical layer-based clock-recovery systems, the clock signal is encoded in the data signal, which is transmitted as a single continuous stream of bit transitions (e.g., 1 s and 0 s). In addition, the timing nature of these bit transitions is preserved between the transmitter and receiver to create a single timing domain. The clock signal can then be recovered by exploiting the regularity of transitions between the 1 s and 0 s represented in the data signal. In packet-based systems, the data signal does not arrive at the receiver as a single continuous stream of 1 s and 0 s. The nature of packet-based systems is to transmit packets when data is available, resulting in a bursty exchange of packets between a transmitter and a receiver. In addition, the bits representing the packet data are synchronized to a local oscillator unique to each transmitter or receiver, creating multiple timing domains between the transmitter and receiver. In some packet-based systems in which the packets are transmitted by the transmitter at a relatively steady rate, it is possible to derive a clock signal from the times at which the packets arrive at the receiver.

Some packet-based data communication applications, such as circuit emulation services (CES), in which circuit-based signals are converted to packet-based signals for transmission and then reconverted back to circuit-based signals at the receiver, have relatively stringent timing requirements for the accuracy of the derived clock signal. One such timing requirement is controlled phase movement or the maximum time interval error (MTIE) limits of the derived clock signal for DS1 or E1 data signals. These stringent timing requirements can be difficult to satisfy in adaptive clock recovery packet-based communication systems in which the overall packet delay (i.e., the duration from the time that a packet leaves the transmitter until the time that the packet arrives at the receiver) can vary for a periodic sequence of transmitted packets due to such phenomena as network loading and path rerouting.

It is a known phenomenon in many data networks that the statistical packet-delay characteristics change as overall network load changes. Thus, the duration between the arrival times of consecutive packets at a receiver can vary unpredictably as network load varies over time. Furthermore, when the path selected for transmitting packets of a particular communication session from a particular transmitter (source) to a particular receiver (destination) changes, e.g., due to a network reconfiguration associated with intermediate node congestion, link failure, or maintenance activities, the time domain of the packets arriving at the receiver will experience a positive or negative step change (referred to herein as a "step-delay"), depending on whether the new path is longer or shorter (in terms of overall delay) than the old path. Clock recovery systems at receivers in such packet-based networks will typically need to take the effects of these phenomena into account in order to satisfy their relevant timing requirements.

SUMMARY

In one embodiment, the present invention is an adaptive clock recovery (ACR) system for a receiver. The ACR system comprises an ACR subsystem, a step-delay detection and measurement (D/M) subsystem, and a step-delay pre-compensation component. The ACR subsystem generates a reference phase signal from an input phase signal representing packet delay values corresponding to arrival times of packets at the receiver. The step-delay D/M subsystem compares the input phase signal to the reference phase signal to detect occurrence of a step-delay in the packet arrival times and determines direction and magnitude of the detected step-delay. The step-delay pre-compensation component adjusts the input phase signal, upstream of the ACR subsystem, based on the determined direction and magnitude of the detected step-delay.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
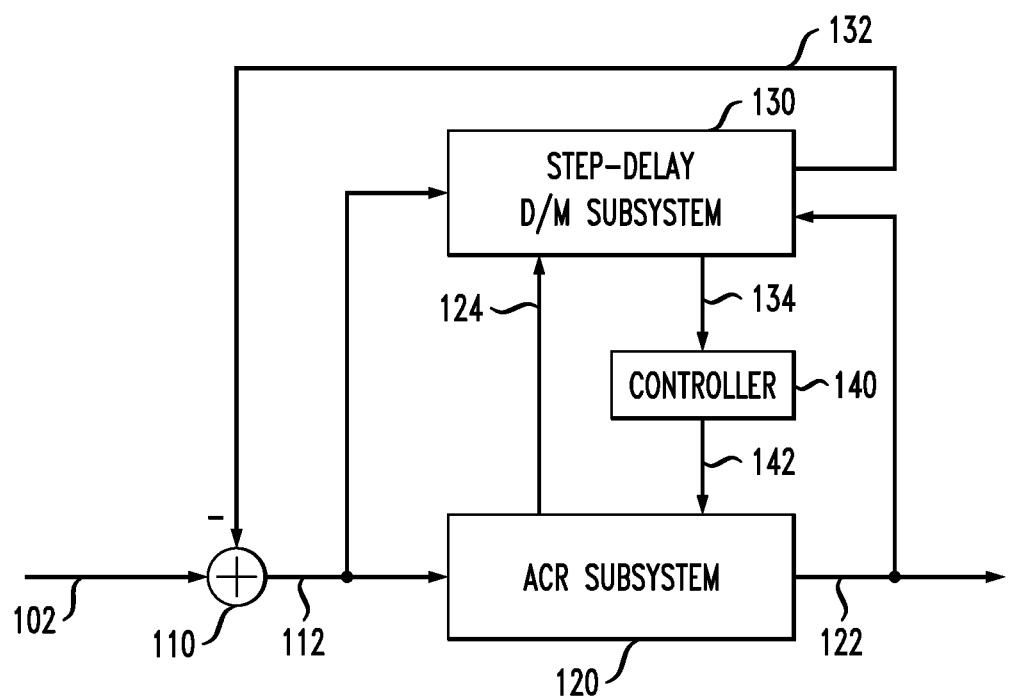
FIG. 1 is a high-level block diagram of an adaptive clock recovery (ACR) system according to one embodiment of the present invention.

FIG. 1 is a high-level block diagram of an adaptive clock recovery (ACR) system 100 according to one embodiment of the present invention. ACR system 100 is implemented in a receiver in a node of a packet-based communication network. ACR system 100 processes digital input packet arrival phase signal 102 to generate digital output phase signal 122, which can be used to control the output frequency and phase of a numerically controlled oscillator (NCO).

Input packet arrival phase signal 102 contains a phase value corresponding to the propagation delay of each packet received at the receiver. The packet propagation delay can be either the actual propagation delay measured with embedded timestamps, or the relative propagation delay measured by taking the difference between the actual arrival time and the expected arrival time. Due to such phenomena as network loading and path rerouting and other factors that influence packet-delay variation, the phase values of input packet arrival phase signal 102 will vary such that, if input packet arrival phase signal 102 were directly used to generate a recovered clock signal, that recovered clock signal would likely fail to satisfy applicable stringent phase stability timing requirements, such as the MTIE for DS1 or E1 data signals.

To address these phenomena, ACR system 100 processes the input packet arrival phase signal 102 to generate output phase signal 122 having compensated phase values that vary sufficiently slowly over a controlled phase range such that a recovered clock signal generated, for example, by applying output phase signal 122 to an NCO, will satisfy the applicable timing requirements.

As shown in FIG. 1, one embodiment of ACR system 100 includes ACR subsystem 120, step-delay detection and measurement (D/M) subsystem 130, step-delay pre-compensation component 110, and controller 140.

One traditional way for an adaptive clock recovery system to derive a recovered clock signal from a periodic sequence of received packets is as follows. The frequency of the recovered clock is established by the average arrival rate of packets received at the receiver. The phase of the recovered clock signal is established by the average packet delay of a series of received packets. Each packet delay is indicative of the propagation delay for a given packet from the source node to the destination node. The periodic sequence of packets from the source to destination node is also known as a packet flow. As the average propagation delay fluctuates, e.g., due to changes in network loading, such an ACR system would detect and adjust the phase of the recovered clock signal to track these delay fluctuations. Due to the nature of packet networks, packet delays tend to fit a "long-tailed" or "right-tailed" statistical distribution. As background traffic loading increases, the "right" tail of the distribution increases and thus causes the average packet delay to also increase. Therefore, ACR systems that phase lock to the average packet delay will tend to phase modulate their recovered clocks in proportion to network loading. According to the embodiment of FIG. 1, instead of phase aligning to the average packet delay of a sequence of packets, ACR system 100 phase aligns to the shortest packet delay, also referred to herein as the delay-floor. For a given path through a network, there is a minimum possible propagation time for a packet to travel from the source node to the destination node. This minimum propagation time is related to a packet having the minimum residence through all intermediate packet switches in the path between the source and destination nodes. The minimum packet propagation time for a given path is commonly called the delay-floor.

Depending on the particular circumstances (e.g., the current network load, number and type of packet switches), a given packet can and typically will take longer than the delay-floor to travel over a given path, but it cannot travel any faster than the delay-floor. Nevertheless, there will be some packets that will arrive at the receiver close to the delay-floor. Although the frequency of packets arriving close to the delay-floor decreases as the network load increases, there will still be some that do so.

The delay value of the packet having the smallest delay, e.g., for all packets arriving within a specified sample window, can be used by the receiver to define the current value of the delay-floor for that sample window. Since packet-delay characteristics can change, the specified sample window used to compute the delay-floor value should be constantly updated. This update process can be done in a number of ways including, for example, a sliding window method where "M" of the most-recent packet-delay values are compared. After defining the current delay-floor value, in order to avoid undesirable fluctuations in the phase of the recovered clock signal, the phase of the recovered clock signal is adjusted to align with the delay-floor value. In this way, the frequency of the recovered clock is based on the average packet arrival rate, but the phase of the recovered clock is based on the delay-floor of a moving sample window.

When the path for a particular packet flow changes (e.g., due to a network reconfiguration), the minimum amount of time that it takes for a packet to travel from the source node to the destination node can and typically will change. If the minimum propagation time for a packet increases from the old path to a longer, new path, then the positive change in the delay-floor is referred to as a positive step-delay. If the minimum propagation time decreases from the old path to a shorter, new path, then the negative change in the delay-floor is referred to as a negative step-delay.

Between such step-delays, ACR system 100 and, in particular, ACR subsystem 120 tracks the typically constant delay-floor for the received packets in order to generate output phase signal 122 having substantially constant phase values. When a step-delay occurs, ACR system 100 and, in particular, the combination of step-delay D/M subsystem 130 and step-delay pre-compensation component 110 detects, measures, and pre-compensates for the shift in the delay-floor associated with that step-delay to enable ACR subsystem 120 to continue to track what it will see as a relatively constant delay-floor.

In general terms, based on the value of step-delay estimate signal 132 generated by step-delay D/M subsystem 130, step-delay pre-compensation component 110 adjusts the phase values in input packet arrival phase signal 102 to generate step-delay-compensated phase signal 112 having step-delay-compensated phase values. Step-delay D/M subsystem 130 processes step-delay-compensated phase signal 112 to detect the presence of and measure the sign (i.e., positive or negative shift direction) and magnitude of step-delays occurring in phase signal 112. In parallel with D/M subsystem 130, ACR subsystem 120 filters step-delay-compensated phase signal 112 to generate a reference phase signal 124 having reference phase values. In addition, ACR subsystem 120 generates output phase signal 122 having output phase values that are filtered versions of the reference phase values.

More particularly, when the processing of ACR system 100 is initialized and until the first step-delay is detected by step-delay D/M subsystem 130, step-delay estimate signal 132 has a value of zero, and step-delay-compensated phase signal 112 is identical to input packet arrival phase signal 102. When the first step-delay is detected in step-delay-compensated phase signal 112, e.g., due to a change in the path that the packets take through the network from the source node to the destination node containing the receiver that implements ACR system 100, step-delay D/M subsystem 130 detects and measures that step-delay, where the value of step-delay estimate signal 132 represents the sign and magnitude of that first step-delay event.

When the new path is longer (in terms of propagation delay) than the old path, then the step-delay estimate signal 132 will have a sign (e.g., positive) that instructs step-delay pre-compensation component (e.g., subtraction node) 110 to apply a negative phase-shift to input packet arrival phase signal 102 to generate step-delay-compensated phase signal 112. On the other hand, when the new path is shorter (in terms of propagation delay) than the old path, then the step-delay estimate signal 132 will have a sign (e.g., negative) that instructs step-delay pre-compensation component 110 to apply a positive phase-shift to input packet arrival phase signal 102 to generate step-delay-compensated phase signal 112. Step-delay D/M subsystem 130 keeps the value of step-delay estimate signal 132 constant until the next step-delay (if any) is detected in step-delay-compensated clock signal 112.

The goal of ACR system 100 is to generate output phase signal 122 having sufficient stability to control the frequency and phase of an output NCO (for example) to satisfy the applicable timing requirements (e.g., MTIE). To achieve that sufficiently constant time domain over multiple step-delays, step-delay D/M subsystem 130 generates the value of step-delay estimate signal 132 based on the accumulated sum of all of the previously detected and measured step-delays. Thus, if the first step-delay is a positive step-delay having a magnitude of 3 phase units, and the second step-delay is a negative step-delay having a magnitude of 1 phase unit, then, after the second step-delay is detected and measured, the step-delay estimate signal 132 will have a value of +2 phase units. If there is an LOS (loss of signal) or other input fault of the input packet stream, then the step-delay accumulator in D/M subsystem 130 will be reset to 0, and the process of step-delay detection, pre-compensation, and accumulation will be restarted with a step-delay estimate signal 132 of 0 phase units.

Controller 140 coordinates the operations of ACR subsystem 120 based on signals received from step-delay D/M subsystem 130. In particular and as described in further detail below, when step-delay D/M subsystem 130 detects a new step-delay in step-delay-compensated phase signal 112, subsystem 130 asserts step-delay detection signal 134 applied to controller 140. In response, controller 140 suspends at least some of the processing of ACR subsystem 120 (i.e., places ACR subsystem 120 in holdover mode) via control signal 142. After step-delay D/M subsystem 130 completes its measurement of the new step-delay and generates an updated value for step-delay estimate signal 132, subsystem 130 de-asserts step-delay detection signal 134. In response, controller 140 resumes the full processing of ACR subsystem 120 (i.e., terminates the holdover mode) via control signal 142. This temporary suspension of at least some of the processing of ACR subsystem 120 during the time interval between detection and measurement of the new step-delay is referred to as holdover mode.

The purpose of the holdover mode is to avoid having the impact of the detected step-delay significantly and adversely affect the timing of output phase signal 122 while the step-delay magnitude is measured. Holdover mode stabilizes the output phase at output phase signal 122 and, more importantly, the phase reference at reference phase signal 124. Reference phase signal 124 is used to measure the magnitude of the newly detected step-delay and remains constant for the duration of the measurement period. Once the new step-delay has been measured and incorporated into step-delay estimate signal 132, this value is subtracted for all incoming packet arrival phase values 102 at the summation point 110. Once the step-delay correction is applied, holdover mode is exited, and the full processing of ACR subsystem 120 can be safely resumed using step-delay-compensated phase signal 112, which will now be generated taking into account all of the previously detected step-delays, including the new step-delay.

Figure 2:
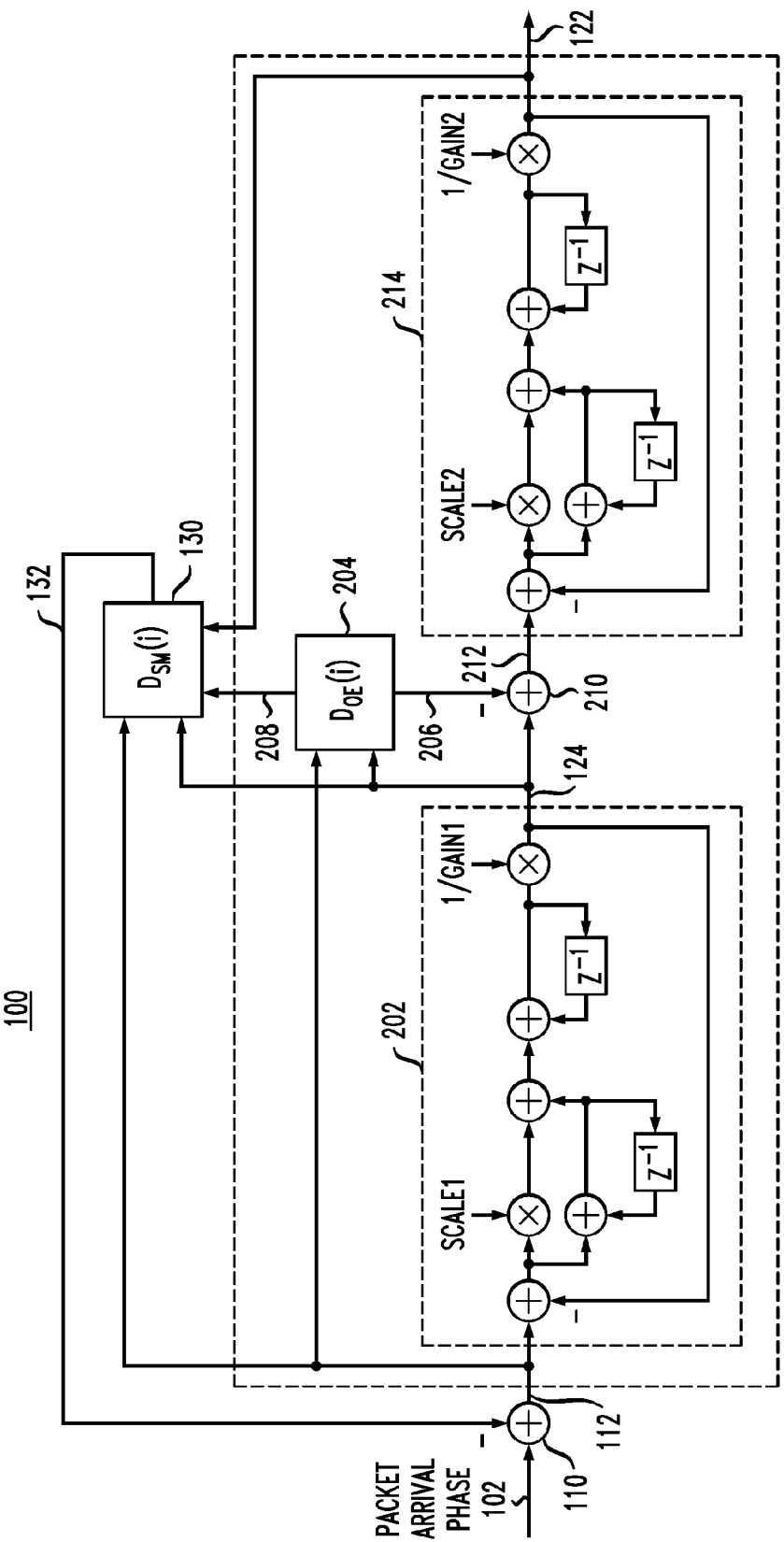
FIG. 2 shows a more-detailed block diagram of the ACR system of FIG. 1, according to one embodiment of the present invention.

FIG. 2 shows a more-detailed block diagram of ACR system 100 of FIG. 1, according to one embodiment of the present invention. As shown in FIG. 2, ACR subsystem 120 of FIG. 1 includes first digital proportional-integral (PI) processor 202, delay-offset estimation component 204, delay-offset compensation component 210, and second digital PI processor 214. Note that the flow of control signals from step-delay D/M subsystem 130 to ACR subsystem 120 via controller 140 is not shown in the representation of ACR system 100 depicted in FIG. 2, although the flow of signals from ACR subsystem 120 to step-delay D/M subsystem 130 is included in the figure.

In general terms, first PI processor 202 generates a phase reference (represented by signal 124) from the step-delay-compensated phase (represented by signal 112), delay-offset estimation component 204 locates the delay-floor (represented by signal 206), delay-offset compensation component 210 generates the phase at the delay-floor (represented by signal 212), and second PI processor 214 frequency filters or smoothes that delay-floor phase to generate an output phase (represented by signal 122).

ACR subsystem 120 performs delay-offset compensation that adjusts the phase values of output phase signal 122 to be substantially equal to the current estimate of the delay-floor. This is accomplished by determining the delay offset $D_O(i)$ between (1) the average packet arrival time as indicated by the mean phase reference value $\mu(i)$ in reference phase signal 124 and (2) the arrival times of those packets that arrive at or sufficiently near the delay-floor as indicated by the packet phase (i.e., delay) values $D(i)$ in step-delay-compensated phase signal 112. This statistical process is called delay-offset estimation. In order to perform this estimation, all received packet arrival times as indicated by the packet delay values $D(i)$ in step-delay-compensated phase signal 112 are compared with the average packet arrival time of the previously received packets as indicated by the mean phase reference value $\mu(i)$ in reference phase signal 124. Those packets that arrive later than the average packet arrival time are ignored by the estimation process and assigned a delay-offset value $D_O(i)$ of 0. Packets that arrive earlier than the average packet arrival time are considered as candidates for defining the delay-floor and assigned a delay-offset value $D_O(i)$ equal to the difference between the average packet arrival time (as indicated by the mean phase reference $\mu(i)$) and their arrival time (as indicated by the packet delay $D(i)$). Groups or statistical sampling windows of consecutive delay-offset values $D_O(i)$ are compared, and the largest value of the group becomes the delay-offset estimate $D_{OE}(i)$ and output as a delay-offset estimate signal 206.

In particular, first PI processor 202 receives and frequency filters step-delay-compensated phase signal 112 from step-delay pre-compensation component 110 to generate reference phase signal 124. Reference phase signal 124 is a measure of the average phase difference of the expected packet arrival time and the actual packet arrival time of the statistical population of all received packets. The delay-offset estimation component 204 uses reference phase signal 124 as a mean phase reference μ(i) to determine if the arrival time of each received packet 112 is earlier or later than the average packet arrival time. If the packet arrival time is greater than the step-delay-compensated phase signal 112, then the packet took longer to traverse the network than the statistical mean of the previously received packets. Likewise, if the packet arrival time is less than the step-delay-compensated phase signal 112, then the packet took less time to traverse the network than the statistical mean of the previously received packets. Packets with arrival times lower than the mean arrival time are candidates to define the delay-floor. The delay-offset estimation component 204 calculates a delay-offset value $D_O(i)$ for each received packet according to Equation (1) as follows:

$$\text{For } \mu(i) > D(i), D_O(i) = \mu(i) - D(i)$$

$$\text{For } \mu(i) \leq D(i), D_O(i) = 0 \qquad (1)$$

Thus, if the mean phase reference μ(i) is greater than the packet delay D(i), then the delay-offset value $D_O(i)$ for that packet is the difference between those two values. Otherwise, the delay-offset value $D_O(i)$ for that packet is set to zero. Note that first PI processor 202 processes both types of packets in continuously updating reference phase signal 124 to yield the mean phase reference μ(i).

Figure 3:
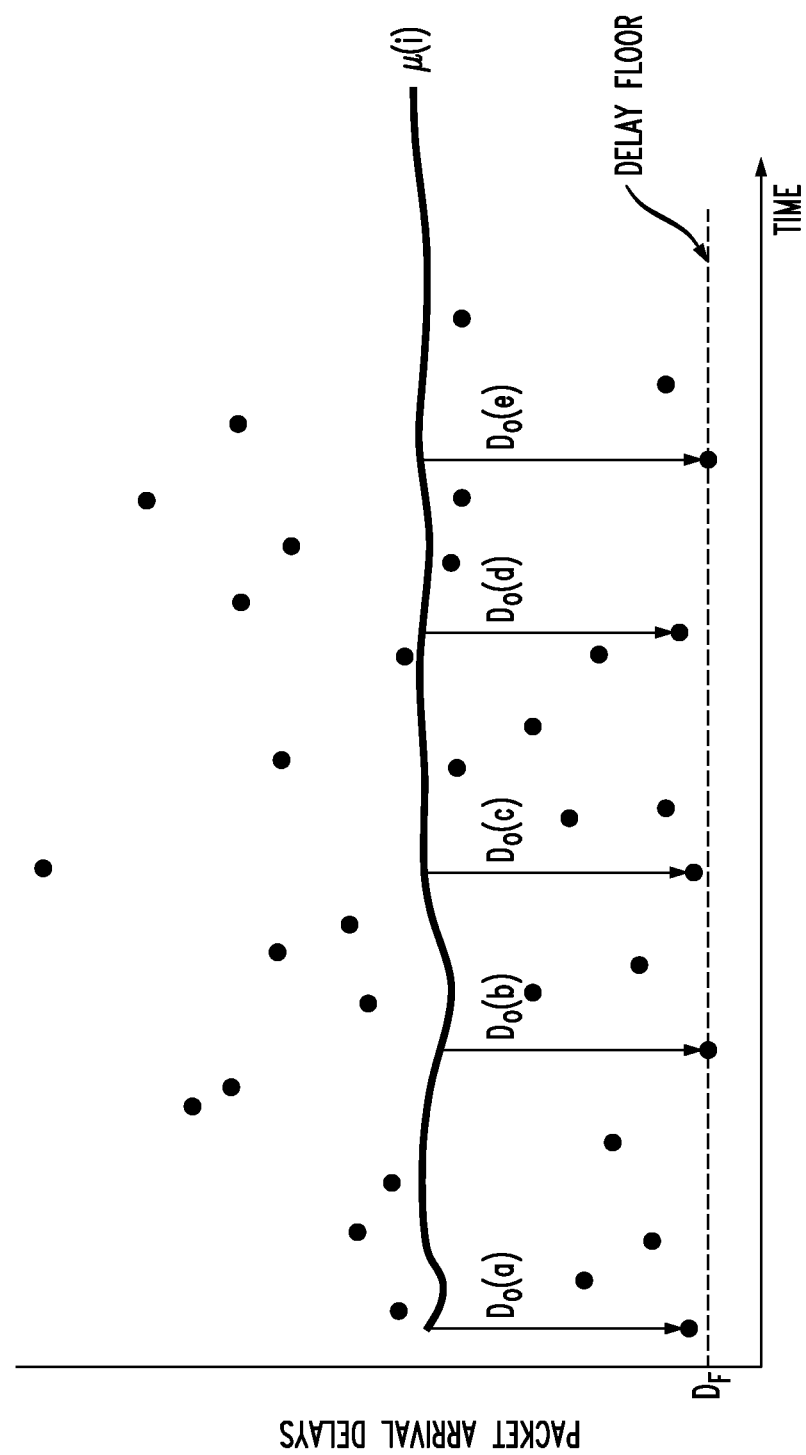
FIG. 3 graphically illustrates the processing of the delay-offset estimation component of FIG. 2 relative to the mean phase reference $\mu(i)$.

FIG. 3 graphically illustrates the processing of delay-offset estimation component 204 of FIG. 2 relative to the mean phase reference μ(i). In FIG. 3, each dot represents the arrival of a different packet at a particular time (X-axis value) and with a particular packet-arrival delay (Y-axis value), and the time-varying mean phase reference μ(i) is plotted relative to the packet-arrival delays for the received packets. In FIG. 3, the delay-floor is represented as having a fixed packet-arrival delay $D_F$. As seen in FIG. 3, packets arrive with delays above and below the mean phase reference μ(i), but no packet arrives with a delay less than the delay-floor $D_F$. It should also be noted that the percentage of packets that have delays equal to the delay-floor will be dependent on a number of factors affecting the propagation of packets through a network for a given packet flow. Generally, the higher the network traffic load of competing traffic through common switching elements, the lower the percentage of delay-floor packets.

For each packet delay D(i), a delay-offset value $D_O(i)$ is computed relative to the mean phase reference μ(i) based on Equation (1). The largest delay-offset value $D_O(i)$ over a specified duration or sample window is indicative of the difference between the current value of the mean phase reference μ(i) and the delay-floor. Due to temporal variations in the mean phase reference μ(i), it is expected that there will also be variations in the largest delay-offset values $D_O(i)$ for different periods of time having the same specified duration. As such, a windowing method that looks at a specified number M of the most-recent delay-offset values $D_O(i)$ tends to track changes in the mean phase reference μ(i) and can therefore be used to yield an accurate estimate $D_{OE}(i)$ of the delay offset between the mean phase reference μ(i) and the delay-floor, as generated using Equation (2) as follows:

$$D_{OE}(i) = \underset{n=i}{\overset{i-M+1}{\text{MAX}}} D_O(n) \qquad (2)$$

where delay-offset estimation component 204 of FIG. 2 transmits the current delay-offset estimate $D_{OE}(i)$ to delay-offset compensation component 210 as delay-offset estimate signal 206. In order to implement the MAX function, the M previous delay-offset values $D_O(i)$ are individually stored. When a new packet arrives, the delay-offset estimate $D_{OE}(i)$ is re-computed using Equation (2), and the oldest delay-offset value $D_O(i-M+1)$ is replaced in memory by the newest delay-offset value $D_O(i)$.

Although Equation (2) corresponds to a max sliding-difference window, other types of overlapping or non-overlapping windows or a combination of overlapping and non-overlapping windows may be used. Although max sliding-difference windows can be designed to yield a different value of delay-offset estimate $D_{OE}(i)$ for each new packet arrival, such implementations tend to increase the implementation complexity.

Delay-offset compensation component 210 adjusts the phase of reference phase signal 124 based on the value of delay-offset estimate signal 206 to generate delay-offset-compensated phase signal 212. In particular, the mean phase reference μ(i) of reference phase signal 124 is decreased by the delay-offset estimate $D_{OE}(i)$, which will always be a non-negative number. This phase compensation will align phase signal 212 with the current location $D_F(i)$ of the delay-floor, as reflected in Equation (3) as follows:

$$D_F(i) = \mu(i) - D_{OE}(i) \qquad (3)$$

Because the delay-offset estimate $D_{OE}(i)$ is based on a statistical analysis of a contiguous set of M packets, there can be discontinuous variations over time in the phase of delay-offset-compensated phase signal 212 due to the delay characteristics of each set of M packets. In order to frequency filter or smooth these phase discontinuities, second PI processor 214 performs phase-smoothing on delay-offset-compensated phase signal 212 to generate output phase signal 122 having a (fully) averaged phase.

In one possible implementation, in order to provide delay-offset measurement stability, the size of the sliding window of Equation (2) is set to be at least 40 times smaller than the time constant of first PI processor, which is itself based on the cutoff frequency of first PI processor 202. Since the function of second PI processor 214 is to phase-smooth the compensated phase signal 212, second PI processor 214 is designed to track the output frequency of first PI processor 202 by setting the bandwidth of second PI processor 214 to be greater than (e.g., about 2 to 2.5 times) the bandwidth of first PI processor 202. Generally, both first and second PI processors 202 and 214 are adjusted to yield an over-damped system response with a damping factor of about 4.

Step-Delay Compensation

The three stages of handling step-delays (i.e., substantial, instantaneous shifts) in the delay-floor are detection, measurement, and pre-compensation. In ACR system 100 of FIGS. 1 and 2, step-delay D/M subsystem 130 performs the detection and measurement stages, based on reference and output phase signals 124 and 122 and other information generated by delay-offset estimation component 204 and provided to D/M subsystem 130 via signal 208, while step-delay pre-compensation component 110 performs the pre-compensation stage based on step-delay estimate signal 132 generated by D/M subsystem 130.

Step-delay detection involves the detection of the occurrence of a step change in the delay-floor. As described in further detail below, in making that detection, the sign of the step change is also determined. The quicker the detection, the greater the prevention of the undesirable result of ACR system 100 changing output phase signal 122 due to tracking an uncompensated step-delay.

Step-delay measurement involves the estimation of the magnitude of the change in the delay-floor. Note that the step-delay measurement process is different from the step-delay detection process and may require a longer period of time in order to measure the size of the shift in the delay-floor with sufficient accuracy. This is mainly due to the statistical delay variation of the received packets after the step-delay event.

In general, for a given level of accuracy, the time that it takes to measure the size of the step-delay is inversely proportional to the occurrence of received packets having delays near the delay-floor over a given sample size. For low network traffic-load conditions, there is less packet delay variation, and a greater number of packets arrive close to the delay-floor. In such situations, a given level of accuracy of the step-delay measurement can be achieved in a shorter period of time than for high traffic-load conditions, where fewer packets arrive close to the delay-floor.

Step-delay pre-compensation involves applying a phase correction, based on the direction and magnitude of the shift in the delay-floor, to the ACR process. In theory, this correction compensates the ACR output (e.g., output phase signal 122 of FIG. 1) so that the output phase stays constant despite the step change in the delay-floor. In ACR system 100 of FIG. 1, the step-delay pre-compensation is implemented using a pre-compensation scheme in which the phase of input packet arrival phase signal 102 is adjusted prior to the filtering of ACR subsystem 120.

Negative Step-Delay Detection

Figure 4:
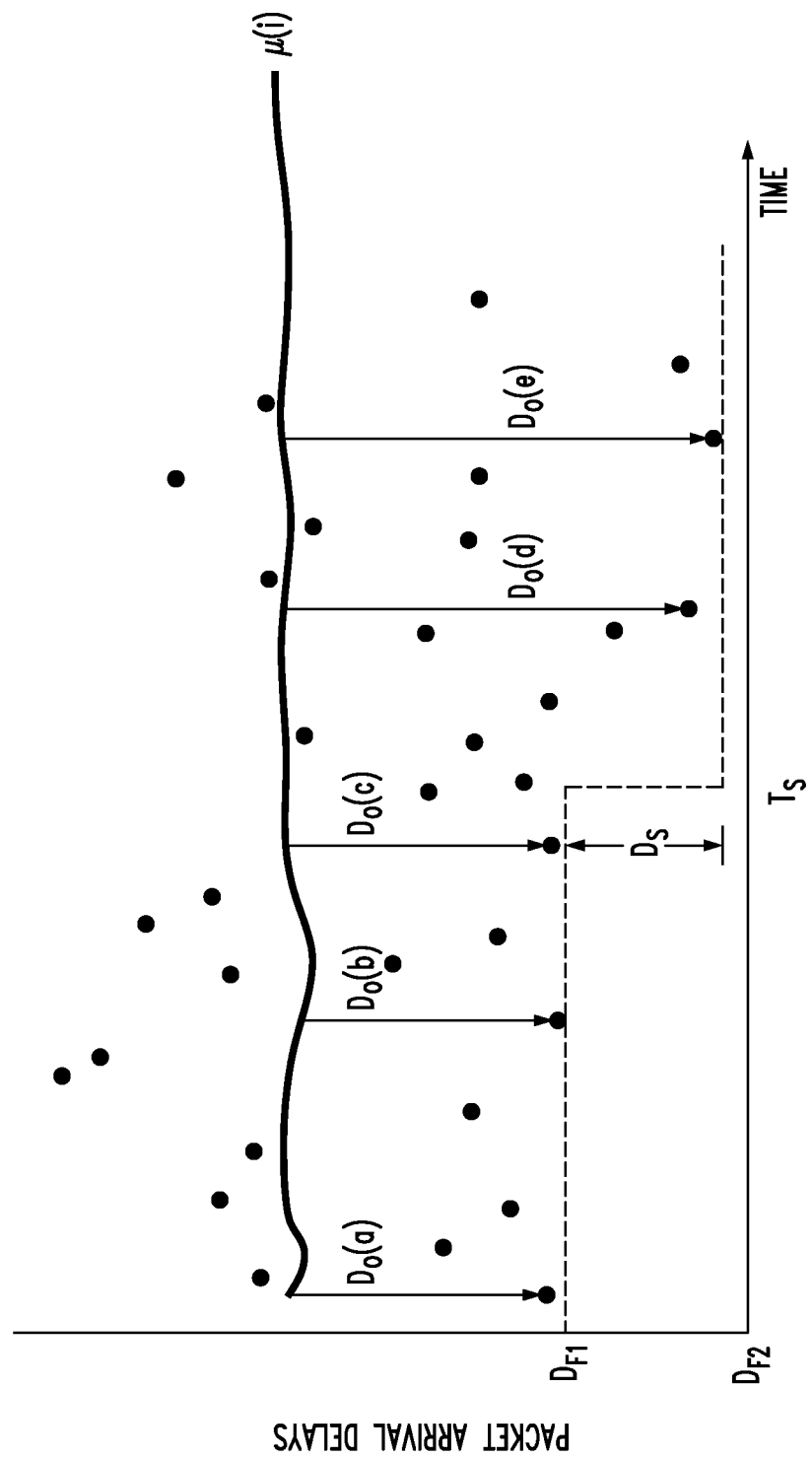
FIG. 4 graphically illustrates the occurrence of a negative step-delay.

FIG. 4 graphically illustrates the occurrence of a negative step-delay. In particular, prior to time $T_S$, the delay-floor is at delay value $D_{F1}$. At time $T_S$, the delay-floor drops by a step-change value $D_S$ to delay value $D_{F2}$, for example, as the result of the packets traveling over a shorter path through the network. Note that the largest delay-offset values $D_O(i)$ increase after the negative step-delay at time $T_S$.

Figure 5:
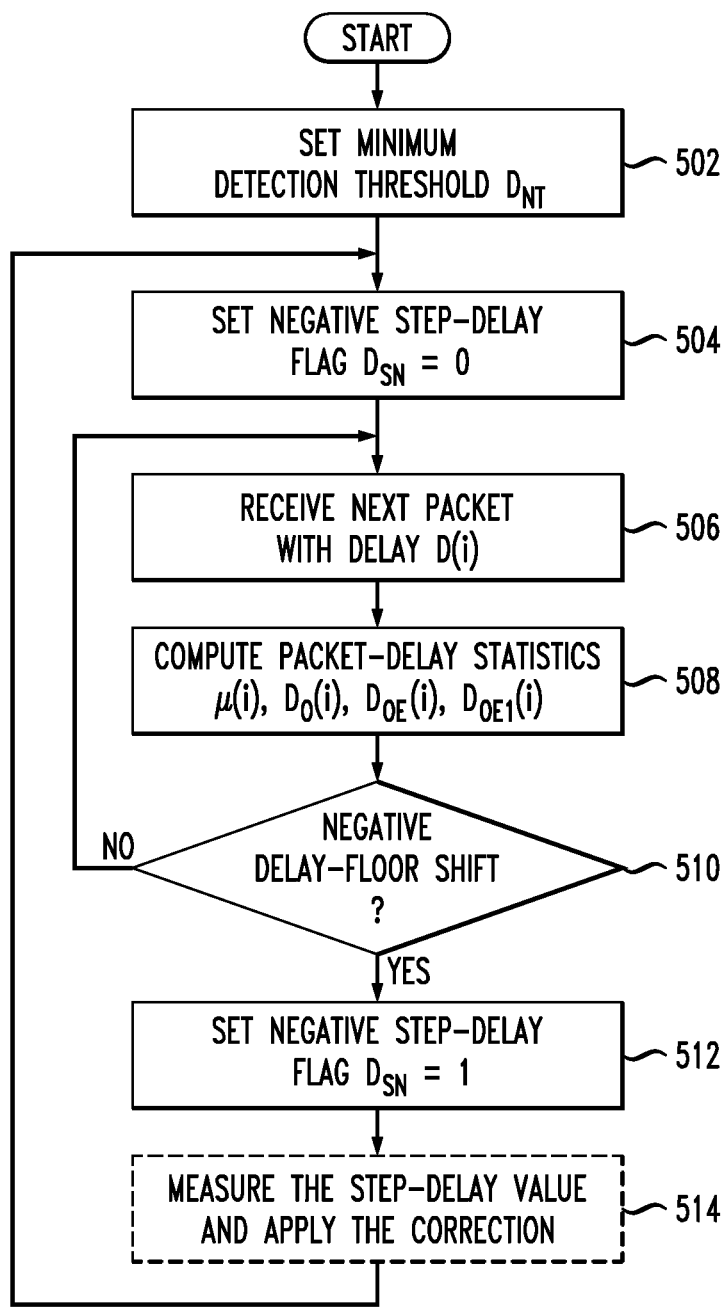
FIG. 5 shows a flow diagram of the processing implemented by the ACR system of FIGS. 1 and 2 to detect a negative shift in the delay-floor, according to one embodiment of the present invention.

FIG. 5 shows a flow diagram of the processing implemented by ACR system 100 of FIGS. 1 and 2 to detect a negative shift in the delay-floor, according to one embodiment of the present invention. Initially, a negative-step-delay detection threshold $D_{NT}$ is set to a suitable value (e.g., less than 10 μsec, such as 9 μsec) (step 502), and a negative step-delay flag $D_{SN}$ is set to 0 (step 504) indicating that a negative step-delay has not been detected.

When a packet having delay value D(i) arrives at the receiver (step 506), packet-delay statistics are generated (step 508). In particular, first PI processor 202 generates the current mean phase reference value μ(i) in reference phase signal 124. In addition, the current delay-offset value $D_O(i)$ is determined according to Equation (1), and the current delay-offset estimate $D_{OE}(i)$ is updated according to Equation (2). In addition, a delay-offset reference $D_{OE1}(i)$ is set to the delay-offset estimate $D_{OE}(i-M)$ for the previous non-overlapping window corresponding to the M packets (i–3M) to (i–2M–1). Note that, in order to avoid duplicate processing, some of the information already being generated by delay-offset estimation component 204 of ACR subsystem 120, such as the current delay-offset estimate $D_{OE}(i)$, can be provided to step-delay D/M subsystem 130 via signal line 208.

Subsystem 130 then determines whether the new packet corresponds to a negative shift in the delay-floor (step 510) by determining whether the difference between the delay-offset reference $D_{OE1}(i)$ and the current delay-offset estimate $D_{OE}(i)$ is greater than or equal to the negative-step-delay detection threshold $D_{NT}$ as in Equation (5) as follows:

$$D_{OE1}(i)-D_{OE}(i) \geq D_{NT}. \quad (5)$$

If not, then a negative shift in the delay-floor is not detected and processing returns to step 506 to await the arrival of the next packet. Otherwise, the comparison of step 510 is true, and subsystem 130 sets the negative step-delay flag $D_{SN}$ to 1 (step 512) to indicate that a negative shift in the delay-floor has been detected.

In step 514, subsystem 130 determines the magnitude of the negative step-delay and decreases the value of step-delay estimate signal 132 accordingly, and pre-compensation component 110 uses that updated step-delay estimate signal to apply an appropriate phase adjustment to input packet arrival phase signal 102 to generate step-delay-compensated phase signal 112. After step 514 is completed, processing returns to step 504 to reset the negative step-delay flag $D_{SN}$ to 0 and await the arrival of the next packet.

Positive Step-Delay Detection

While a negative step-delay can be relatively easily detected by looking for packet delays that exceed a threshold below the previous delay-floor, detecting positive step-delays is not as straightforward, because, even in the absence of a step-delay, there will be packets that arrive with delays above the delay-floor, as seen, for example, in FIG. 3.

In certain embodiments of the present invention, positive step-delays are detected by looking for a specified number $M_C$ of consecutive packet arrivals having delay values D(i) that exceed the existing delay-floor $D_F$ by at least a specified positive step-delay threshold $D_{PT}$. The current value of the delay-floor is available at two different points in ACR system 100 of FIG. 2. The phase of delay-offset-compensated phase signal 212 is given by μ(i)-$D_{OE}(i)$. However, the value of the delay-offset estimate $D_{OE}(i)$ will reflect discontinuous variations due to the windowing process of Equation (2) used to compute this value. These phase discontinuities can be minimized or eliminated by second PI processor 214 yielding a more-stable, frequency-filtered output phase signal 122 having output phase value $D_{OUT}$. The value of output phase $D_{OUT}$ is better suited to establish the location of delay-floor $D_F$.

Figure 6:
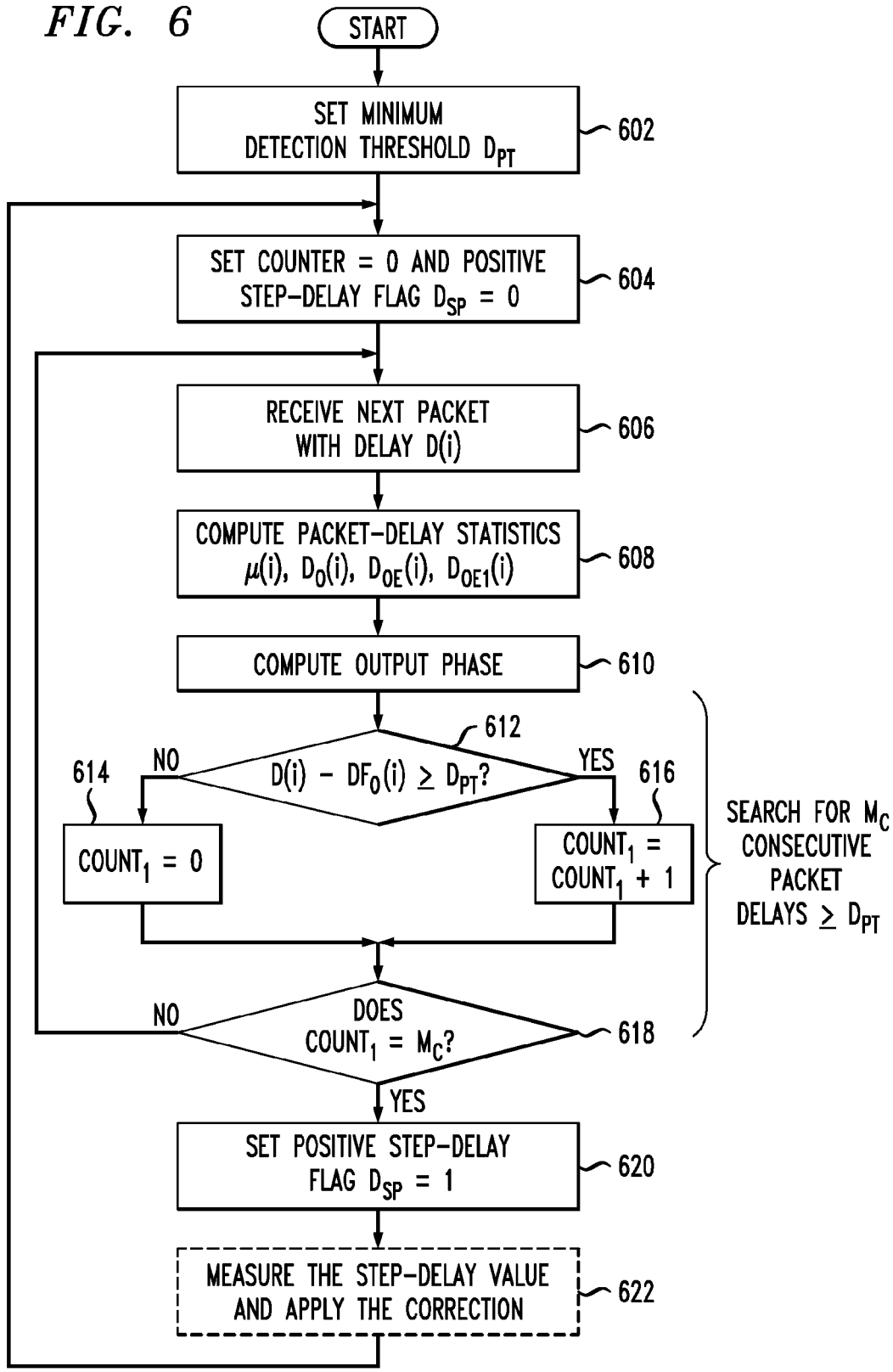
FIG. 6 shows a flow diagram of the processing implemented by the ACR system of FIGS. 1 and 2 to detect a positive shift in the delay-floor, according to one embodiment of the present invention.

FIG. 6 shows a flow diagram of the processing implemented by ACR system 100 of FIGS. 1 and 2 to detect a positive shift in the delay-floor, according to one embodiment of the present invention. Initially, a positive-step-delay detection threshold $D_{PT}$ is set to a suitable value (e.g., less than 10 μsec, such as 9 μsec) (step 602), and a positive step-delay flag $D_{SP}$ is set to 0 (step 604) indicating that a positive step-delay has not been detected. In step 604, counter value $Count_1$ is also set to 0.

When a packet having delay value D(i) arrives at the receiver (step 606), packet-delay statistics are generated (step 608). The packet-delay statistics are the same as those in step 508 of FIG. 5. In addition, the output phase $D_{OUT}(i)$ of output phase signal 122 is determined and assumed to be the delay-floor (step 610).

D/M subsystem 130 then determines whether the delay D(i) of the new packet exceeds the delay-floor $D_{OUT}(i)$ by at least the positive-step-delay detection threshold $D_{PT}$ (step 612). If not, then the number ($Count_1$) of consecutive packets is set to 0 (step 614). Otherwise, the value of $Count_1$ is incremented (step 616). If the value of $Count_1$ does not equal the count threshold $M_C$ (step 618), then processing returns to step 606 to await arrival of the next packet. Otherwise, the value of $Count_1$ does equal the count threshold $M_C$ (step 618), and subsystem 130 sets the positive step-delay flag $D_{SP}$ to 1 (step 620) to indicate that a positive shift in the delay-floor has been detected. The processing of steps 612-620 can be represented by the following pseudocode:

IF D(i)-$D_{OUT}(i) \geq D_{PT}$, THEN $Count_1=Count_1+1$, ELSE $Count_1=0$

IF $Count_1=M_C$, THEN $D_{SP}=1$, ELSE $D_{SP}=0$

Note that, if, at any point in the counting process, a packet arrives with a sufficiently small delay, then the counter $Count_1$ is reset to 0 at step 614, and the process begins anew at step 606.

In step 622, subsystem 130 determines the magnitude of the positive step-delay and increases the value of step-delay estimate signal 132 accordingly, and pre-compensation component 110 uses that updated step-delay estimate signal to apply an appropriate phase adjustment to input packet arrival phase signal 102 to generate step-delay-compensated phase signal 112. After step 622 is completed, processing returns to step 604 to reset the positive step-delay flag $D_{SP}$ to 0 and await the arrival of the next packet.

Note that, since each shift in the delay-floor may be due to either a positive step-delay or a negative step-delay, the negative-step-delay detection processing of FIG. 5 and the positive-step-delay detection processing of FIG. 6 are both implemented, either serially or in parallel, for each received packet.

An optimal value of count threshold $M_C$ should allow for fast positive-step-delay detection while preventing a false positive positive-step-delay detection. Ideally, the value of $M_C$ provides a statistical certainty that a positive-step-delay event has occurred. As indicated in FIG. 3, under normal operating conditions, some packets will arrive having relatively large delays. As described earlier, the number of packets having large delays increases as network loading increases.

A suitable value for count threshold $M_C$ can be determined, for example, based on simulations with maximum expected load. Such simulations can be used to determine the maximum time interval between low-delay packets. To be conservative, a margin of, for example, 1.5 times this maximum time interval can be used to select the count threshold $M_C$, which is determined by multiplying the time interval by the packet rate.

Step-Delay Measurement

After a positive or negative step-delay has been detected, step-delay D/M subsystem 130 measures the magnitude of that step-delay.

Figure 7A:
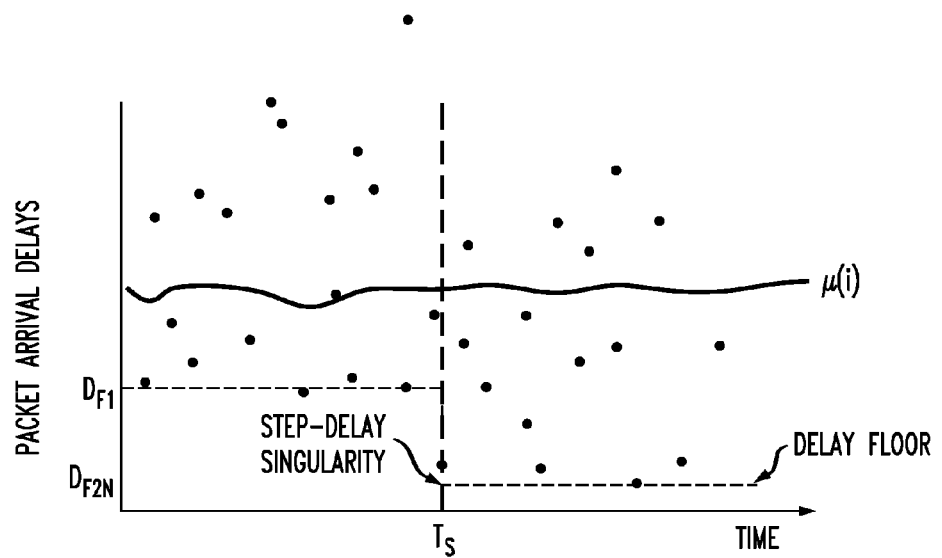
FIG. 7(a) graphically represents a first scenario in which a negative step-delay occurs, while FIG. 7(b) graphically represents a second scenario in which a positive step-delay occurs.
Figure 7B:
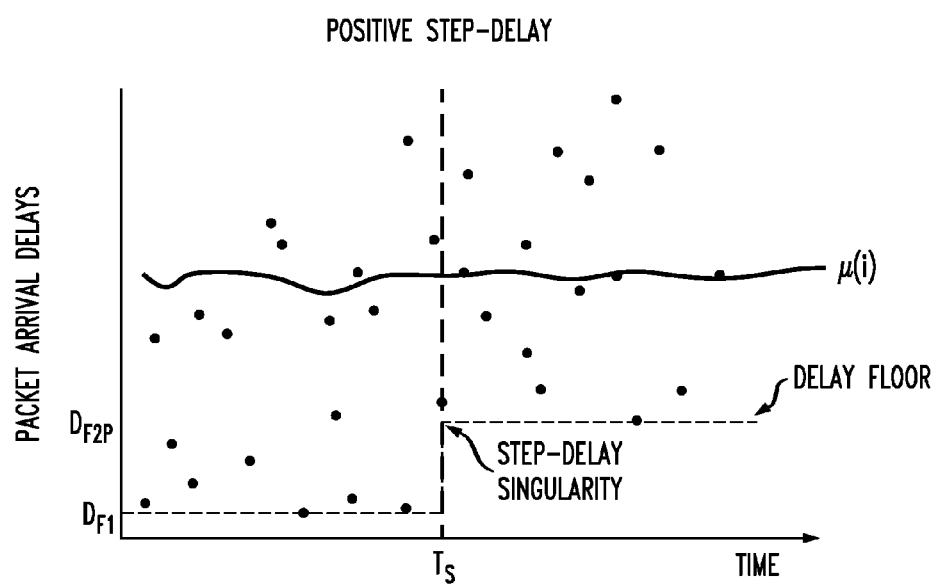

FIG. 7(a) graphically represents a first scenario in which a negative step-delay occurs at time $T_S$ that shifts the delay-floor from a delay of $D_{F1}$ to a (smaller) delay of $D_{F2N}$, while FIG. 7(b) graphically represents a second scenario in which a positive step-delay occurs at time $T_S$ that shifts the delay-floor from a delay of $D_{F1}$ to a (larger) delay of $D_{F2P}$.

When a negative step-delay occurs, the magnitude of the step-delay can be measured and the new delay-floor $D_{F2N}$ can be determined by looking for the maximum delay-offset value $D_O(i)$ over a specified number of packets following the detection of the step-delay. In the exemplary negative step-delay of FIG. 7(a), this maximum delay-offset value is the delay offset $D_O(c)$.

When a positive step-delay occurs, the magnitude of the step-delay can be measured and the new delay-floor $D_{F2P}$ can be determined by looking for the minimum delay-shift value $D_S(i)$ over a specified number of packets following the detection of the step-delay. In the exemplary positive step-delay of FIG. 7(b), this minimum delay-shift value is the delay shift $D_S(a)$.

Figure 8:
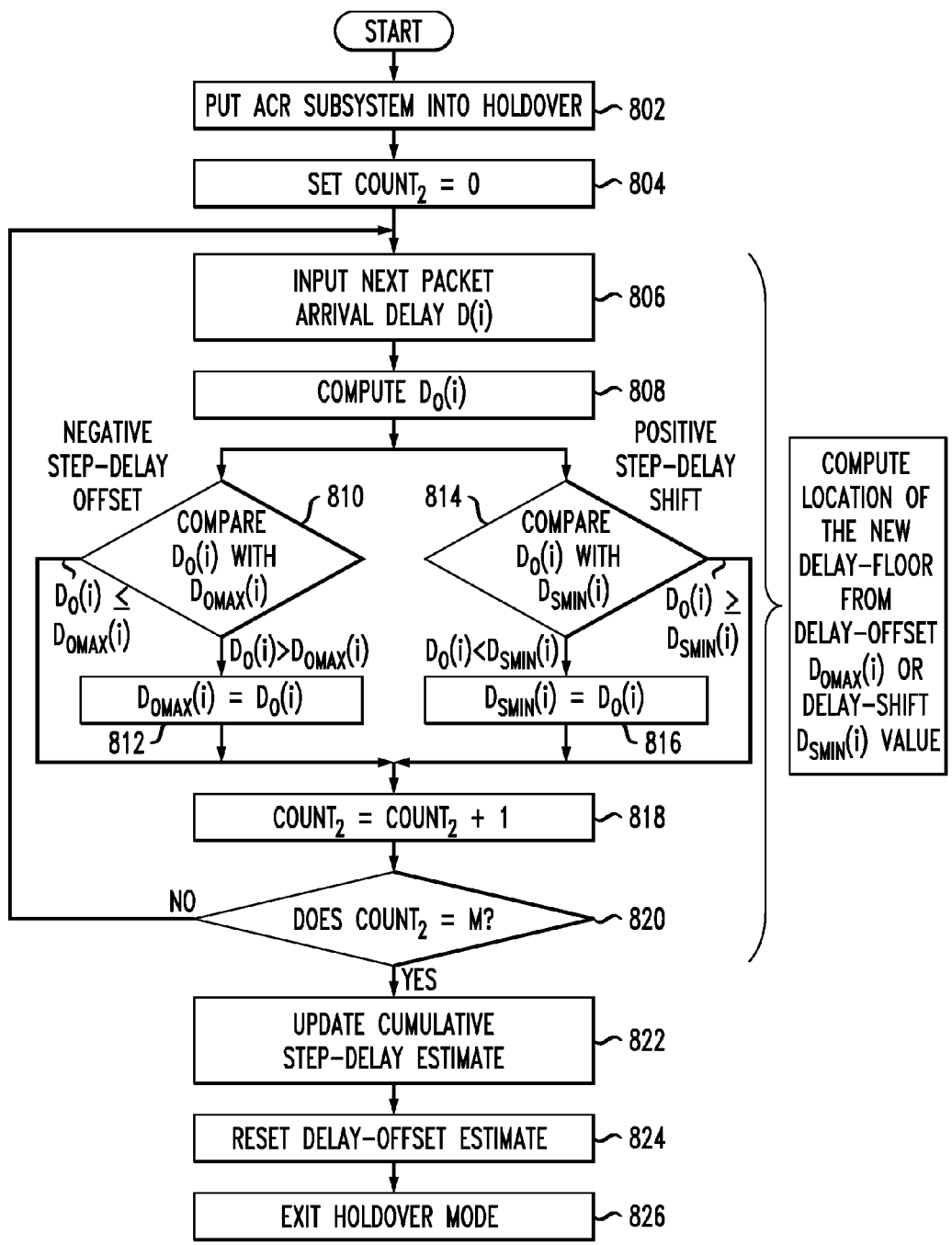
FIG. 8 is a flow diagram of the processing implemented by the ACR system of FIGS. 1 and 2 to measure the magnitude of a detected step-delay, according to one embodiment of the present invention.

FIG. 8 is a flow diagram of the processing implemented by ACR system 100 of FIGS. 1 and 2 to measure the magnitude of a detected step-delay, according to one embodiment of the present invention. As described previously, during the time that it takes for the step-delay to be detected, the phase of output phase signal 122 will begin to drift as ACR subsystem 120 processes packets corresponding to the new delay-floor. For a given step-delay magnitude, this drift will typically be larger for positive step-delays than for negative step-delays, because it usually takes longer to detect a positive step-delay than a negative step-delay. In order to limit the size of this drift, when either a positive or negative step-delay is detected, ACR subsystem 120 is placed into holdover mode (step 802 of FIG. 8). As described earlier, this is achieved by step-delay D/M subsystem 130 asserting step-delay detection signal 134 to controller 140 which, in turn, applies appropriate control signals 142 to ACR subsystem 120.

In one implementation, during holdover mode, the processing of both first PI processor 202 and second PI processor 214 of FIG. 2 is suspended, while the processing of the other components in ACR subsystem 120 continues uninterrupted. Note that, when the processing of first PI processor 202 is initially suspended, the value of the mean phase reference µ is frozen at its most recent value for the duration of the holdover mode. Similarly, when the processing of second PI processor 214 is initially suspended, the phase value of output phase signal 122 is also frozen at its most recent value for the duration of the holdover mode. In one possible implementation, the output signals of the first and second PI processors are frozen by setting to zero the output values of the summation nodes just before the scale functions in the respective PI processors of FIG. 2. Other implementations are also possible.

Subsystem 130 then resets a packet counter $Count_2$ to 0 (step 804) and awaits the arrival of the next packet having delay $D(i)$ (step 806). When the next packet arrives, the delay-offset value $D_O(i)$ is determined (step 808). In one implementation, the delay-offset $D_O(i)$ is calculated by delay-offset estimation component 204 based on Equation (1) and provided to subsystem 130 via signal 208.

Although FIG. 8 represents the step-delay measurement processing for both positive and negative step-delays, the processing is different for those two different types of step-delays. These differences are reflected in FIG. 8, where steps 810 and 812 are implemented for negative step-delays (as indicated by negative step-delay flag $D_{SN}$ of FIG. 5 being set to 1), while steps 814 and 816 are implemented for positive step-delays (as indicated by positive step-delay flag $D_{SP}$ of FIG. 6 being set to 1).

For negative step-delays, subsystem 130 looks for the maximum delay offset $D_{OMAX}(i)$ in a measurement window corresponding to the arrival of the next M packets following the detection of the step-delay. The maximum delay-offset $D_{OMAX}(i)$ is initialized (e.g., in step 812) to the first $D_O(i)$ sample after the detection of the negative step-delay. For each of the next M−1 packets, the packet's delay-offset value $D_O(i)$ is compared to the current stored value of the maximum delay-offset $D_{OMAX}(i)$ (step 810). If the packet's delay-offset value $D_O(i)$ is greater than the maximum delay-offset $D_{OMAX}(i)$, then the maximum delay offset $D_{OMAX}(i)$ is set equal to the packet's delay-offset value $D_O(i)$ (step 812). Otherwise, the maximum delay offset $D_{OMAX}(i)$ is not changed. In either case, processing continues to step 818.

For positive step-delays, subsystem 130 looks for the minimum delay shift $D_{SMIN}(i)$ in a measurement window corresponding to the arrival of the next M packets following the detection of the step-delay. The minimum delay shift $D_{SMIN}(i)$ is initialized (e.g., in step 816) to the first $D_O(i)$ sample after the detection of the positive step-delay. For each of the next M−1 packets, the packet's delay-offset value $D_O(i)$ is compared to the current stored value of the minimum delay shift $D_{SMIN}(i)$ (step 814). If the packet's delay-offset value $D_O(i)$ is less than the minimum delay shift $D_{SMIN}(i)$, then the minimum delay shift $D_{SMIN}(i)$ is set equal to the packet's delay-offset value $D_O(i)$ (step 816). Otherwise, the minimum delay shift $D_{SMIN}(i)$ is not changed. In either case, processing continues to step 818.

In step 818, subsystem 130 increments packet counter Count$_2$. If the packet counter Count$_2$ has not reached the end of the M-packet window (step 820), then processing returns to step 806 to await the arrival of the next packet. Otherwise, the end of the M-packet window has been reached, and subsystem 130 updates the step-delay estimate signal 132 (step 822) by either (i) decreasing its value by the maximum delay offset $D_{OMAX}(i)$ for a negative step-delay or (ii) increasing its value by the minimum delay offset $D_{SMIN}(i)$ for a positive step-delay.

Subsystem 130 resets the current delay-offset estimate $D_{OE}(i)$ to be equal to the stored delay-offset reference $D_{OE1}(i)$ (step 824) in order to compensate for the incorporation of the negative step-delay $D_O(i)$ value that was input to delay-offset compensation component 204 before the negative step-delay was detected. The current value of the step-delay, computed in step 822, is then applied to the input of ACR subsystem 120 at step-delay pre-compensation component 110 as a difference. ACR subsystem 120 then exits holdover mode by resuming full operations of ACR subsystem 120 (step 826). Note that steps 822, 824, and 826 should all be implemented before the arrival of the next packet.

Advantages

One of the advantages of ACR system 100 of FIG. 1 is that the ACR function can be implemented using relatively simple digital signal processing (DSP) techniques, such as proportional-integral (PI) processing. As such, multiple instances of the ACR system can be implemented in a single integrated circuit, where each different ACR system can provide the ACR function for a different communication session. In this way, large numbers (e.g., 16, 32, 64, or even more) of T1/E1 circuits can be supported by a device having a single integrated circuit while still satisfying the associated timing requirements.

Alternatives

In one implementation, first and second PI processors 202 and 214 of FIG. 2 are second-order, type 2 PI processors, although processors of other order and/or type may alternatively be used. Although ACR subsystem 120 has been described as being implemented using two PI processors, the three-stage architecture of ACR subsystem 120 can be implemented using other types of closed-loop control processors, such as proportional-integral-derivative (PID) processors, that can be used to generate phase signals that reflect filtered differences between the delays in the arrival of packets at a receiver and a local reference signal.

Although ACR subsystem 120 and step-delay D/M subsystem 130 of FIG. 1 have been described in the context ACR system 100, which performs step-delay pre-compensation, those skilled in the art will understand that the filtering of ACR subsystem 120 and/or the step-delay detection and measurement of D/M subsystem 130 can be implemented in the context of an ACR system that performs other forms of step-delay compensation. For example, in a post-compensation scheme, compensation for a detected and measured step-delay is applied to the output phase signal generated by the ACR subsystem. In other schemes, step-delay compensation is performed internal to the ACR subsystem, for example, by a compensation component that combines the step-delay compensation of component 110 of FIG. 1 with the delay-offset compensation of component 210 of FIG. 2.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An adaptive clock recovery (ACR) system for a receiver, the ACR system comprising:
    an ACR subsystem that generates a reference phase signal from an input phase signal representing packet delay values corresponding to arrival times of packets at the receiver;
    a step-delay detection and measurement (D/M) subsystem that compares the input phase signal to the reference phase signal to detect occurrence of a step-delay in the packet arrival times and determine direction and magnitude of the detected step-delay; and
    a step-delay pre-compensation component that adjusts the input phase signal, upstream of the ACR subsystem, based on the determined direction and magnitude of the detected step-delay.

2. The ACR system of claim 1, wherein the ACR subsystem comprises:
    a first closed-loop control processor that generates the reference phase signal from the input phase signal;
    a delay-offset estimation component that compares the input phase signal to the reference phase signal to generate a delay-offset estimate signal representative of a delay-floor phase offset for the packet arrival times relative to the reference phase signal;
    a delay-offset compensation component that generates a delay-offset-compensated phase signal based on the reference phase signal and the delay-offset estimate signal; and
    a second closed-loop control processor that generates, from the delay-offset-compensated phase signal, an output phase signal that can be used to generate a recovered clock signal with compensated phase.

3. The ACR system of claim 2, wherein each of the first and second closed-loop control processors is a digital proportional-integral (PI) processor.

4. The ACR system of claim 2, wherein the second closed-loop control processor has a bandwidth that is greater than a bandwidth of the first closed-loop control processor.

5. The ACR system of claim 4, wherein the bandwidth of the second closed-loop control processor is at least twice the bandwidth of the first closed-loop control processor.

6. The ACR system of claim 2, wherein the second closed-loop control processor frequency filters to smooth phase discontinuities in the delay-offset-compensated phase signal.

7. The ACR system of claim 2, wherein the delay-offset estimation component determines a delay-offset value for each packet and generates the delay-offset estimate signal by identifying a largest delay-offset value within a sliding window of packets.

8. The ACR system of claim 1, wherein the step-delay D/M subsystem detects occurrence of a positive step-delay by determining that a specified number of packets within a timing window had a packet delay that exceeded a delay-floor corresponding to a set of previous packet arrival times by more than a specified delay threshold value.

9. The ACR system of claim 1, wherein the step-delay D/M subsystem detects occurrence of a negative step-delay by determining that a packet had a packet-delay below a delay-floor corresponding to a set of previous packet arrival times.

10. The ACR system of claim 1, further comprising a controller that places the ACR subsystem into a holdover mode between the detection of the step-delay and completion of the determination of the direction and magnitude of the detected step-delay.

11. The ACR system of claim 10, wherein the reference phase signal is not updated during the holdover mode.

12. The ACR system of claim 10, wherein the output phase signal is not updated during the holdover mode.

13. The ACR system of claim 1, wherein the step-delay D/M subsystem determines a magnitude of a positive step-delay by generating, for each packet in a timing window, a delay-shift value relative to the reference phase signal in holdover mode corresponding to a set of previous packet arrival times and determining, for the timing window, a minimum delay-shift value representing the magnitude of the positive step-delay.

14. The ACR system of claim 13, wherein:
    after the step-delay D/M subsystem determines the magnitude of the positive step-delay, the step-delay D/M subsystem (i) includes a value of the magnitude in a history of previous step-delays and (ii) uses the value of the magnitude to update a step-delay estimate signal used by the step-delay pre-compensation unit to adjust the input phase signal; and
    after the step-delay pre-compensation unit applies the updated step-delay estimate signal, the ACR subsystem is taken out of holdover mode and placed into normal operating mode.

15. The ACR system of claim 14, wherein, if packets stop arriving at the receiver for a specified period of time to create a loss-of-signal condition for the ACR subsystem, then the history of previous step-delays is set to a value of 0.

16. The ACR system of claim 1, wherein the step-delay D/M subsystem determines a magnitude of a negative step-delay by generating, for each packet in a timing window, a delay-offset value relative to the reference phase signal in holdover mode corresponding to a set of previous packet arrival times and determining, for the timing window, a maximum delay-offset value representing the magnitude of the negative step-delay.

17. The ACR system of claim 16, wherein:
    after the step-delay D/M subsystem determines the magnitude of the negative step-delay, the step-delay D/M subsystem (i) includes a value of the magnitude in a history of previous step-delays and (ii) uses the value of the magnitude to update a step-delay estimate signal used by the step-delay pre-compensation unit to adjust the input phase signal; and
    after the step-delay pre-compensation unit applies the updated step-delay estimate signal, the ACR subsystem is taken out of holdover mode and placed into normal operating mode.

18. The ACR system of claim 17, wherein, if packets stop arriving at the receiver for a specified period of time to create a loss-of-signal condition for the ACR subsystem, then the history of previous step-delays is set to a value of 0.

19. A receiver-implemented method for recovering a clock signal at a receiver in a packet system, the method comprising:
    generating a reference phase signal from an input phase signal representing packet delay values corresponding to arrival times of packets at the receiver;
    comparing the input phase signal to the reference phase signal to detect the occurrence of a step-delay in the packet arrival times and determine direction and magnitude of the detected step-delay; and adjusting the input phase signal, upstream of the generation of the reference phase signal, based on the determined direction and magnitude of the detected step-delay.

\* \* \* \* \*